Sept. 26, 1950 — W. L. BERRY — 2,523,492
SPRING-TYPE POSTAL SCALE
Filed Oct. 1, 1946 — 2 Sheets-Sheet 1
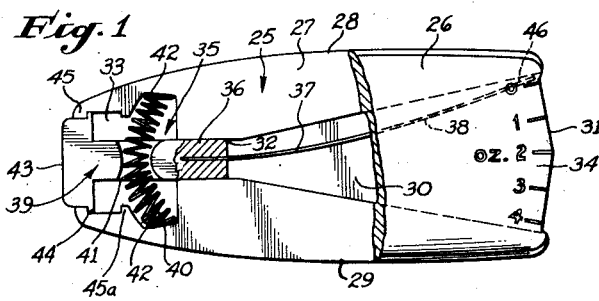
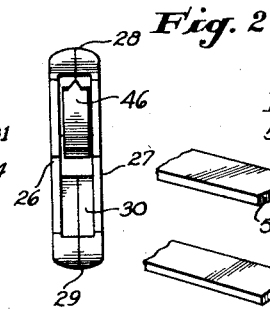
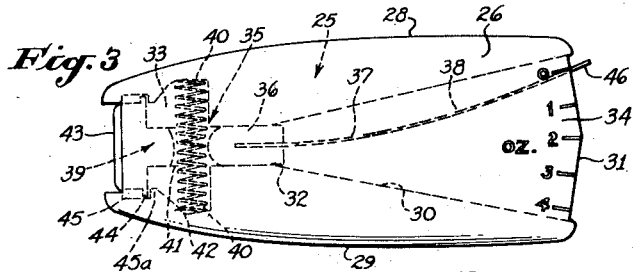
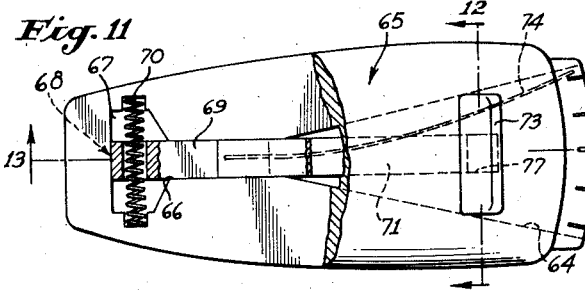
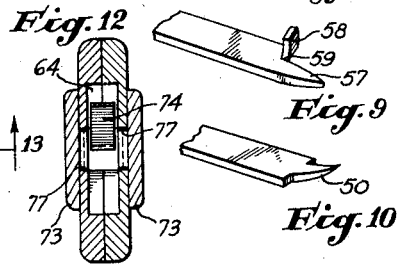
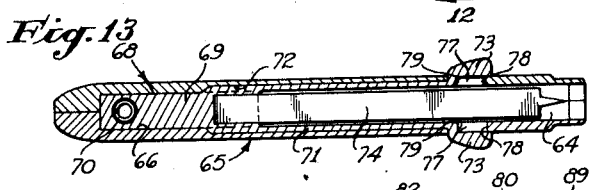
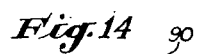
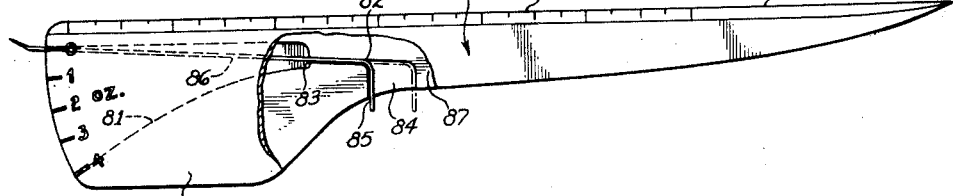
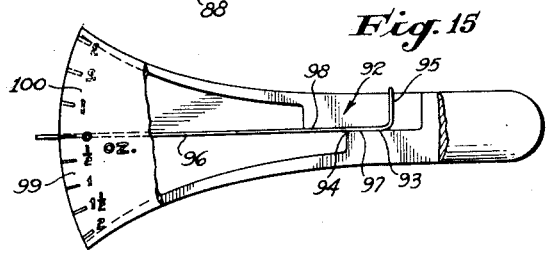
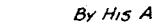
INVENTOR:
WILLIAM L. BERRY
BY HIS ATTORNEYS
HARRIS, KIECH, FOSTER & HARRIS Sept. 26, 1950 W. L. BERRY 2,523,492
SPRING-TYPE POSTAL SCALE
Filed Oct. 1, 1946 2 Sheets-Sheet 2
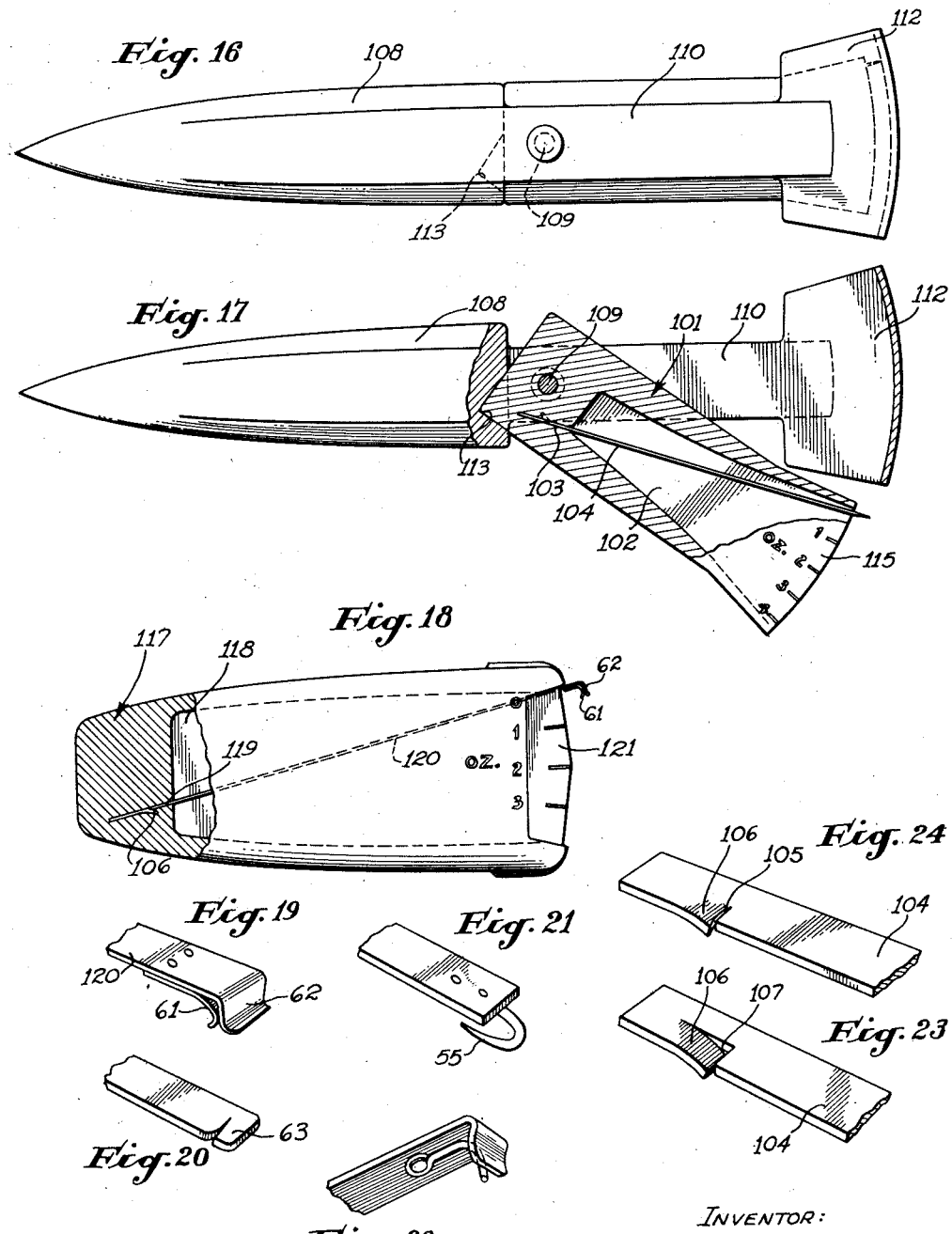
INVENTOR:
WILLIAM L. BERRY
By His Attorneys
HARRIS, KIECH, FOSTER & HARRIS Patented Sept. 26, 1950

2,523,492

UNITED STATES PATENT OFFICE 2,523,492

SPRING-TYPE POSTAL SCALE

William L. Berry, Los Angeles, Calif.

Application October 1, 1946, Serial No. 700,528

13 Claims. (Cl. 265—63)

My invention relates to weighing devices for small articles and more particularly to devices for weighing postal articles.

The illustrative applications hereinafter referred to are particularly suited to the weighing of postal items, but it is not intended that this be a limitation, functional or otherwise, on the invention.

One object of this invention is to provide a compact, convenient weighing unit readily adaptable to domestic, commercial or industrial uses for weighing small articles. For example, the invention is readily usable for determination of the amount of postage required on letters and other small postal articles.

The preferred embodiment of the invention is a novel weighing unit of a size convenient to handle and adapted to the weighing of small articles by impaling or otherwise suspending them from a movable weighing member contained therein. Such a weighing member is usually a cantilever-mounted spring member fixedly or movably mounted in a chamber of the body or housing of the weighing unit. The weighing unit preferably provides indicia graduated to record deflections of the weighing member to an accuracy of from one to several decimal points. The preferred embodiment provides a source of protection for the attachment means and/or the weighing member when the device is not in use. It is an object of the invention to provide a weighing unit having one or more of such features.

Referring to the drawings, which are for illustrative purposes only:

Fig. 1 is a front elevational view, partially broken away, showing a preferred embodiment of the weighing unit with the spring member in retracted position;

Fig. 2 is an end elevational view of the weighing unit of Fig. 1;

Fig. 3 is a front elevational view similar to Fig. 1, showing the spring member in extended position ready for use;

Fig. 4 is a fragmentary perspective view of the attachment or impaling portion of the spring member;

Figs. 5 to 10 are fragmentary perspective views of the front or impaling portions of spring members that are alternatives to the one shown in Fig. 4;

Fig. 11 is a front elevational view, partially broken away, of an alternative embodiment showing the spring member in normal or retracted position;

Fig. 12 is a sectional view taken along the line 12—12 of Fig. 11;

Fig. 13 is a longitudinal sectional view as taken along line 13—13 of Fig. 12 with the spring member shown in elevation;

Fig. 14 is a front elevational view, partially broken away, of an alternative embodiment of the weighing device showing the spring member in extended position;

Fig. 15 is a front elevation, partially broken, of a further embodiment showing the spring member in extended position;

Fig. 16 is a front elevation of another alternative embodiment;

Fig. 17 is a front elevation, in partial section of the embodiment of Fig. 16 showing the weighing unit rotated in a clockwise direction relative to its protective means;

Fig. 18 is a front elevation, in partial section, of still another alternative embodiment;

Fig. 19 is a fragmentary perspective view of the front end of the spring of Fig. 18 showing a clamping fit type of attachment means for suspension of the article;

Figs. 20 to 22 are views of attachment means alternative to Fig. 19;

Figs. 23 and 24 are fragmentary perspective views of typical rear portions of a flat spring member with means for securing the spring member in cantilever relationship with the body, Fig. 24 illustrating the type of rear portion used in the embodiment of Fig. 18.

Referring to Figs. 1 and 2, the invention is shown as including a two-section body 25 providing two parallel side walls 26 and 27, a top wall 28, and a bottom wall 29. These walls cooperate in bounding on all sides a chamber 30 having a rear end and an open forward end. As best shown in Figs. 1 and 2, said chamber is relatively deep in a direction parallel to the side walls and relatively shallow in a transverse direction. The top and bottom walls 28 and 29, respectively, diverge from each other to form a mouth 31 at the open end of the chamber 30. These top and bottom walls also cooperate in forming a passage 32 extending from the rear of the chamber 30 and communicating with a cavity 33 in the rear of the body.

In practice, the body 25 is formed of two mating sections contacting and adhering to each other at the mid-plane of the device. Each such section provides pockets or depressions which cooperate with those of the other section when assembled, to form the chamber 30, the passage 32 and the cavity 33. Such sections may be molded of any suitable plastic and adhered at the mid-section by any suitable adhesive. One or both of such sections is provided with indicia located relatively close to the mouth 31 of the body 25. Said indicia is intended to be used in recording deflections of a weighing member contained in said body, said deflections being caused by the weight of an article suspended therefrom. In a preferred embodiment, best shown in Fig. 3, said indicia is a scale 34 graduated in ounces. Readings of considerable accuracy can be obtained by sighting along a flat sighting face or surface of the weighing member at the point where the suspended article has caused the weighing member to come to rest.

As best shown in Fig. 1, the chamber 30 contains a movable weighing means 35, a portion of which is a movable operating member 36 slidable in the passage 32. The forward portion of this movable weighing means 35 comprises a movable means such as a movable weighing member 37 which deflects or moves in accordance with the weight of an article suspended therefrom. Preferably this weighing member 37 is a spring member 38, usually a flat spring or blade extending along the chamber with its face extending transversely of the chamber. A spring member having a width about eight times its thickness is preferred. This spring member is supported as a cantilever by the operating member 36, as by having its rear end molded in this member. As will be hereinafter described, the article to be weighed may be attached to the forward end of the spring member and its deflection noted as a measure of the suspended weight, the degree of flexing being limited by the bottom wall 29.

As best shown in Figs. 1 and 3, the rear portion of the movable weighing means 35 extends to the exterior of the cavity 33 and includes an engageable means 39 for moving the movable operating member 36 along the passage 32 and for projecting and retracting the forward end of the spring member 38 from and into the mouth 31.

In a preferred arrangement a spring means normally urging said operating member into a retracted position is used. For example, a helically-coiled compression spring 40 is shown as extending through an opening 41 in the operating member 36 with its ends pressing against upper and lower walls 42 of the cavity 33. The spring 40 is initially formed or subsequently deformed so that its axis is arcuate or curved and so that its normal or semi-relaxed shape is as shown in Fig. 1. In this position it exerts a resilient force on the operating member urging this member and its attached spring member 38 into the retracted position shown in Fig. 1.

The engageable means 39 includes an engageable member or button 43 which projects from the cavity 33 when the operating member 36 is in retracted position for engagement by the thumb or a finger of the operator while the device is held in the hand. This button carries projections 44 which engage shoulders 45 of the cavity 33 to determine the maximum retracted position of the operating member or shoulders 45a to determine the maximum advanced position of this operating member.

When the button 43 is pressed inwardly to assume its position shown in Fig. 3, the axis of the helical spring 40 straightens out and the operating member 36 and its associated spring member 38 move forwardly into advanced position, the maximum advancement being determined by engagement between the projections 44 and shoulders 45a. The helical spring 40 shown, is one embodiment of a spring which exerts a decreasing resilient force on the operating member as it moves toward an advanced position, this being desirable as it minimizes the physical force needed to hold the operating member in advanced position during the weighing operation.

The forward end of the spring member 38 carries an attachment means 46 which may take the form of any of the attachment means shown in Figs. 4–10, inclusive, or Figs. 19–22, inclusive. With a retractable weighing device for postal items as in Fig. 1, I prefer to use an attachment means of the impaling type, for example, a relatively sharply pointed means which may penetrate the postal item or other article to be weighed. The impaling point may then be retracted into the chamber 30 to prevent accidental contact or damage to the point. When in advanced position such impaling means extends sufficiently beyond the mouth of the body to allow the article to be conveniently suspended therefrom.

As best shown in Fig. 4, said impaling means consists of a sharp impaling point 50 having a base portion 51 and having a means for limiting the depth of penetration. The penetration limiting means shown in Fig. 4 consists of at least one shoulder portion 52 extending out from the base in the plane of the spring member and perpendicular to its center line. In Fig. 4 two such shoulder portions are shown. In Fig. 5 the impaling point is formed by convergence of two arch-shaped surfaces in the vertical plane with shoulder means similar to that shown in Fig. 4. In Fig. 6 a separate impaling means 53 of needle type construction is held by end portion 54 of the spring member 38 which is rolled circumferentially to embrace the impaling member. In Fig. 7 a separate impaling member 55, also of similar needle type construction, is attached to the end of the spring member by any suitable means such as rivets or other fastening devices; however, welding, brazing, or similar means may also be employed. In Fig. 8 the impaling point entails at least one arched surface 56 and the base and shoulder means are similar to Fig. 4. Fig. 9 shows at least one curved surface 57 intersecting with another surface in the same plane to form an impaling point with a rectangular section 58 of the spring member turned upward to form a limiting shoulder perpendicular to said spring member at the base 59 of said impaling point. Fig. 10 is of similar construction to Fig. 4 with the exception that the impaling point 50 is curved upward with respect to the spring member.

Further embodiments of attachment means are shown in Figs. 19 to 22, inclusive. In Fig. 19, a lower clip 61 is suitably fastened to the spring, end section 62 having been turned perpendicular to the main member to cooperate with said clip in forming a clamp. In Fig. 20 the extreme end section of the flat spring is taper-split to provide a portion 63 slightly removed from its plane to cooperate in forming a wedge means of attachment. Fig. 21 shows a device similar to Fig. 7 but with the pointed member 55 bent to form a hook; such an attachment means is convenient for use in weighing any small article by impalement or by simple suspension on the hook. Fig. 22 shows a clamp type of attachment similar to Fig. 19 except that the lower clip is of wire or cylindrical construction. All of the above attachment means are suited to the weighing of small articles. They are particularly applicable to weighing light postal articles such as envelopes, small packages and other relatively small or thin forms.

In practice, the operation of the postal weighing device is as follows: the body is held and positioned in one hand with a finger or thumb of said hand exerting force on the engageable means to move the operating member and its contained flat spring member forward. When the attachment means on said spring member is extended beyond the mouth of the body, the article to be weighed is impaled or otherwise attached to the spring member and released. A reading representing the weight of the attached article is taken from the graduated scale 34 or other indicia located on the postal weighing device. When the said flat spring member comes to rest the reading is taken by sighting along the face of the said flat spring member to a point on the said scale or indicia. The article, for example an envelope, can be mechanically disattached by retraction of the impaling-type spring member of Figs. 4–10 which, when withdrawn again into the mouth of the body, is thereby removed from the envelope providing it with no further means of support.

In the alternative embodiment of Figs. 11, 12 and 13, the engageable means is positioned relatively close to the forward end of the weighing device so that the device can be held in the hand and the engageable means operated by the thumb. In this embodiment the engageable means terminates close to the mouth of a chamber 64 of body 65, formed substantially as previously described. A movable weighing means extends along passage 66 and into a closed-ended cavity 67, the movable weighing means being here indicated by the numeral 68.

In this embodiment, the movable weighing means 68 includes an operating member 69 sliding in the passage 66 and providing an opening which receives a helical spring 70 disposed in the cavity 67. Extending forwardly from the operating member 69 are two thin, relatively long, extension arms 71 which slide in longitudinal grooves 72 of the side walls of the body 65. The forward ends of these arms 71 carry engageable members in the form of bar-like projections 73 which can be engaged by the thumb. Molded in or otherwise secured to the operating member 69 is a spring member 74, provided with an impaling point as previously described, this point being movable from its illustrated retracted position to an advanced or exposed position by forward movement of the projections 73. As best shown in Fig. 13, each arm 71 extends outward through, and slides along, a longitudinal slot 77 in one of the side walls of the body 65. Forward motion of the movable weighing means 68 is limited by contact between end surface 78 of the slot 77 and face 79 of the corresponding extension arm 71. Upon release of forward pressure on the projection 73, the movable weighing means 68 is returned to its retracted position by the action of the spring 70.

Another embodiment of the weighing device is shown in Fig. 14 as including a body 80 provided with a chamber 81. This embodiment includes a movable weighing means 82 which is slidably supported in a passage 83 communicating with a downwardly-facing cavity 84. The movable weighing means comprises a flat spring with a downwardly-bent portion extending into the cavity 84 to provide an actuating means 85 for moving the weighing means 82 from its advanced full line position to its retracted dotted line position. The forward end of this flat spring forms a spring member 86 which carries a suitable attachment means, such as any of the impaling points previously described.

In this embodiment the body 80 may be formed with an indented portion 87, the chamber 81 being subsequently closed by a correspondingly-shaped cover member 88 suitably adhered in place after the weighing means is in place. An additional feature of this embodiment is a dimensional scale 89 which is useful in determining lineal dimensions of the postal item or other small articles to be weighed. The rear portion of the body 80, serving as a handle, may provide a beveled edge 90 for the dimensional scale 89. Likewise this rear portion may be tapered to be readily usable as a letter opener.

Still another embodiment of the weighing device, illustrated in Fig. 15, provides a dual sensitivity for the weighing operation. Here a body 92 provides a flaring chamber, a passage and a cavity as in Fig. 14. Similarly, a movable weighing means 93 slides along the passage, indicated at 94, and includes a bent portion 95 extending from the cavity to provide for advancement and retraction of the weighing means. This weighing means, as in Fig. 14, is a flat spring, the forward end forming a spring member 96 carrying an impaling point. The normal position of this spring member 96 is at the mid-plane of the chamber and the rear end of this chamber provides two fulcrum shoulders 97 and 98 spaced at different distances from the mouth of the chamber. When in the position shown, the shoulder 97 will determine the point of initial flexure of the spring member 96 and the lever arm will be relatively long so that a small article suspended from the end of the spring member 96 will cause a relatively large deflection thereof, readable on a scale 99 on one side of the body 92. However, if the weighing device is inverted, the shoulder 98 will determine the point of initial flexure and the same weight will cause less deflection of the spring member 96, readable on a scale 100 disposed on the opposite side of the body 92. Due to the change in point of initial flexure of the spring member 96, the device will have a dual sensitivity, the weighing range in one position being also greater than in the other position.

The embodiment of Figs. 16 and 17 represents a form of the invention in which a shield-like protection is provided for the attachment means, such as an impaling point. Referring particularly to Fig. 17, this embodiment includes a body 101 providing an open-ended chamber 102 closed on all sides, but providing an open mouth at its forward end. The rear portion of the body 101 provides a slot 103 to receive a weighing means shown as a flat spring with its base secured in the slot 103 and its forward portion forming a spring member 104. The flat spring is mounted as a cantilever and its forward end carries an attachment means, such as an impaling point, as previously described. In this embodiment the weighing means is fixed to the body 101. To retain the rear position of the flat spring in the slot 103, this rear portion may be slotted at 105 (see Fig. 24) with an adjacent section deformed from the plane of the flat spring to form a locking tab 106. With this construction the rear end of the flat spring can be inserted into the slot 103 and will automatically be locked therein against withdrawal. If desired a locking construction as suggested in Fig. 23 can be used, this form providing an additional longitudinal slot 107 so that the locking tab 106 is curved throughout a major portion of its length.

In the embodiment of Figs. 16 and 17, the rear portion of the body 101 is pivoted to a handle-like body 108 by a pin 109 to swing from a closed position, shown in Fig. 16, into an open or operating position, shown in Fig. 17. The handle-like body 108 provides forwardly extending arms 110, the pin 109 being secured to these arms and extending through the space therebetween. Carried by the forward ends of the arms 110 is an arcuate hood 112 which protects the impaling point or other attachment means when the device is closed. The handle-like body 108 may be made dagger-shaped to constitute a letter opener. It provides an angularly disposed notch 113 which receives one corner of the body 101 when swung to open position. The notch 113 acts as a stop for such movement of the body 101. When this embodiment is to be used for weighing small articles, the body 101 is pivoted to its open position with the device held so that the spring member 104 is approximately horizontal. The article, such as a letter, is then impaled, its weight deflecting the spring member 104 to indicate the weight on a scale 115 carried by the body 101.

Fig. 18 illustrates another embodiment. Here the device includes a body 117 providing a chamber 118 and having a groove 119 at the base of the chamber. The weighing means is a flat spring with its rear portion, constructed as in Fig. 23 or Fig. 24, being forced into the groove 119, the locking tab 106 retaining the spring in place. The flat spring is thus mounted as a cantilever and its forward portion comprises a weighing member 120. The extreme forward end thereof carries an attachment means, illustrated as being of the clamp type shown in Fig. 19. Deflections of the weighing member 120 can be measured by reference to a scale 121 on the body 117.

Among other important features of the invention is the concept of protecting the weighing member, as by mounting it to move in a chamber providing protecting side walls and by shielding its attachment means, e. g., an impaling point, from accidental contact. In this latter connection, it is an important concept of the invention to protect such an impaling point by moving same into a chamber, e. g., the chamber of the main body or a chamber provided by the hood 112 of the embodiment of Figs. 16 and 17. Another important feature, in the preferred embodiments of the invention, is the use of a spring member mounted as a cantilever to deflect in an amount determined by the suspended weight. Still another important feature is to use a flat spring moving opposite a calibrated scale so that the operator can sight along the face of the spring to increase the accuracy of the readings.

Although I have described certain specific embodiments of the invention, various changes, modifications and substitutions may be incorporated without departing from the spirit of the invention. Consequently, I do not intend to be limited to the specific embodiments illustrated and reserve the right to all such changes, modifications and substitutions as properly come within the scope of the appended claims.

I claim as my invention:

1. In a weighing device for small articles, the combination of: a body providing a chamber open at one end; a spring member providing a forward end and a rear end; means receiving said rear end for mounting said spring member in said chamber as a cantilever with said forward end adjacent said open end of said chamber whereby said spring member will flex when downward pressure is applied to said forward end, said open end of said chamber being of sufficient size to receive said forward end of said spring member and freely accommodate same during its flexure; and an attachment means carried by and positioned at said forward end of said spring member for hanging the article to be weighed, said body having indicia thereon to indicate the amount of flexure of said spring member and thus the weight of the article hung from said attachment means.

2. A weighing device as defined in claim 1, in which said attachment means comprises an impaling point for penetrating the article to be weighed, and shoulder means for limiting the degree of penetration of such article by said impaling point and for holding said article spaced from contact with said body during the weighing operation.

3. A weighing device as defined in claim 1, in which said chamber is relatively deep in the direction of movement of said spring member and relatively shallow in a transverse direction, and in which said spring member is a flat spring providing a face extending in said transverse direction, said face providing a sighting surface along which the operator can sight in viewing said indicia.

4. A weighing device as defined in claim 1, in which said body provides two parallel side walls, a top wall and a bottom wall, said walls bounding said chamber on all sides, said top and bottom wall diverging from each other toward said open end.

5. A weighing device as defined in claim 1, in which said attachment means includes an impaling point extending from said open end of said chamber, and in which said body includes a guard portion, and including means for moving said impaling point within said guard portion to protect said point from damage when said weighing device is not in use.

6. In a weighing device for small articles the combination of: a body providing a chamber having a rear end and an open forward end, said body providing a passage communicating with said rear end of said chamber; a retractable weighing means comprising a rear portion slidable in said passage and a forward portion comprising a spring member extending along said chamber toward said open forward end, said rear portion supporting said spring member as a cantilever; and an attachment means on the forward end of said member for hanging the article to be weighed, said rear portion being movable in said passage to move said attachment means into and from said chamber.

7. A weighing device as defined in claim 6, in which said attachment means comprises an impaling point for penetrating the article to be weigher, said impaling point being retractable into said chamber to protect said point from damage when said weighing device is not in use.

8. In a weighing device for small articles the combination of: a body providing a chamber having a rear end and an open forward end, said body providing a passage communicating with said rear end of said chamber; an operating member slidable in said passage; a spring member carried by said operating member to move therewith, said spring member extending along said chamber toward said open forward end, said operating member supporting said spring member as a cantilever in said chamber; and an attachment means on the forward end of said spring member adjacent said forward open end of said chamber for hanging the article to be weighed, the movement of said operating member being sufficient to move said attachment means into and from said open forward end of said chamber.

9. A weighing device as in claim 8, in which said operating member includes an engageable means extending to the exterior of said body for moving said operating member along said passage.

10. A weighing device as in claim 8, in which said operating member includes an engageable means extending to the exterior of said body for moving said operating member along said passage, and including a spring normally urging said operating member into retracted position.

11. In a weighing device for small articles, the combination of: a body providing a chamber open at one end to provide a mouth, said mouth being bounded by an upper wall, a bottom wall and two side walls; a flat spring member providing a forward end and a rear end; and means for mounting said rear end of said spring member relative to said body to permit flexure of said spring member in said chamber as a cantilever while said forward end extends through said mouth whereby said spring member will flex when downward pressure is applied to said forward end, said mouth being of sufficient size to freely accommodate said spring member during its flexure, said bottom wall limiting the degree of flexure of said spring member, said forward end of said spring member comprising an attachment means for hanging the article to be weighed from said forward end, said body having indicia thereon to indicate the amount of said flexure.

12. In a weighing device for small articles, the combination of: an invertible body providing a chamber open at its front end to provide a mouth, said body providing a pair of shoulders spaced longitudinally from each other in said chamber; and a spring member extending longitudinally along said chamber, said shoulders being on opposite sides of said spring member, said spring member providing a rear portion retained in said body at a position to the rear of each of said shoulders, said spring member also providing an intermediate portion selectively contactable with said shoulders upon flexure of said spring member in opposite directions and providing a front portion of a size to extend from said mouth, said front portion providing an attachment means for suspending the article to be weighed, said shoulders selectively acting as fulcrum points for said spring member upon flexure thereof in opposite directions.

13. A weighing device as defined in claim 12, in which said body provides a passage for slidably receiving said rear portion of said spring member, and including means for sliding said spring member along said passage and relative to said spaced shoulders to extend and retract said attachment means respectively from and into said mouth.

WILLIAM L. BERRY.

REFERENCES CITED

The following references are of record in the file of this patent:

UNITED STATES PATENTS

| Number | Name | Date |
|---|---|---|
| 2,009,363 | Scheurer | July 23, 1935 |

FOREIGN PATENTS

| Number | Country | Date |
|---|---|---|
| 227,451 | Germany | Oct. 22, 1910 |